US008089393B2

(12) United States Patent
Nettleton et al.

(10) Patent No.: US 8,089,393 B2
(45) Date of Patent: Jan. 3, 2012

(54) RELATING TARGET TRACKING

(75) Inventors: Eric William Nettleton, Sidney (AU);
 Christopher Mark Lloyd, Bristol (GB)

(73) Assignee: BAE Systems PLC, London (GB)

( * ) Notice: Subject to any disclaimer, the term of this patent is extended or adjusted under 35 U.S.C. 154(b) by 818 days.

(21) Appl. No.: 11/817,114

(22) PCT Filed: Jun. 8, 2007

(86) PCT No.: PCT/GB2007/002093
 § 371 (c)(1),
 (2), (4) Date: Aug. 24, 2007

(87) PCT Pub. No.: WO2007/144570
 PCT Pub. Date: Dec. 21, 2007

(65) Prior Publication Data
 US 2009/0231183 A1    Sep. 17, 2009

(30) Foreign Application Priority Data

Jun. 13, 2006 (EP) .................................. 06270058
Jun. 13, 2006 (GB) ................................ 0611572.9

(51) Int. Cl.
 *G01S 13/72* (2006.01)
 *G01S 13/00* (2006.01)
(52) U.S. Cl. ............. 342/59; 367/87; 367/95; 367/117; 382/100; 382/103; 703/2; 342/73; 342/74; 342/82; 342/89; 342/175; 342/195
(58) Field of Classification Search .............. 342/59, 342/73–103, 118, 126–157, 175, 195, 61–68, 342/159–164; 367/87, 95–105, 117; 703/2; 382/100, 103, 181, 224, 228
See application file for complete search history.

(56) References Cited

U.S. PATENT DOCUMENTS

| | | | | |
|---|---|---|---|---|
| 5,202,691 A * | 4/1993 | Hicks | ............................... | 342/90 |
| 5,325,098 A | 6/1994 | Blair et al. | | |
| 5,414,643 A * | 5/1995 | Blackman et al. | ............... | 342/95 |
| 5,581,490 A * | 12/1996 | Ferkinhoff et al. | ................ | 703/2 |
| 5,631,653 A * | 5/1997 | Reedy | ............................... | 342/62 |
| 5,909,190 A * | 6/1999 | Lo et al. | ......................... | 342/159 |
| 6,226,409 B1 * | 5/2001 | Cham et al. | .................... | 382/228 |
| 6,243,037 B1 * | 6/2001 | Pulford et al. | ................... | 342/95 |
| 6,278,401 B1 * | 8/2001 | Wigren | .......................... | 342/195 |
| 7,079,991 B2 * | 7/2006 | Li et al. | ............................. | 703/2 |
| 7,480,395 B2 * | 1/2009 | Parunak et al. | ............... | 382/103 |
| 2003/0200065 A1 * | 10/2003 | Li et al. | ............................. | 703/2 |

(Continued)

OTHER PUBLICATIONS

Matthew Ridley et al., "Tracking in Decentralised Air-Ground Sensing Networks", Proceedings of the Fifth International Conference on Information Fusion, 2002, vol. 1, pp. 616-623.

(Continued)

*Primary Examiner* — Bernarr Gregory
(74) *Attorney, Agent, or Firm* — Buchanan Ingersoll & Rooney PC

(57) ABSTRACT

An exemplary system and method are for tracking a target in a decentralised network having a plurality of sensing nodes. Each node makes observations of a target, performs a multiple models tracking algorithm based on the observations, and updates tracking information stored therein. Each node communicates the updated track information to selected other nodes in the network. In response to receiving track information from another node, each node fuses the receiving track information with local track information.

16 Claims, 3 Drawing Sheets

U.S. PATENT DOCUMENTS

2003/0228035 A1  12/2003  Parunak et al.

OTHER PUBLICATIONS

Ting Yu et al., "Decentralized Multiple Target Tracking Using Nettled Collaborative Autonomous Trackers", Proceedings of the 2005 IEEE Computer Society Conference on Computer Vision and Pattern Recognition, 2005, vol. 1, pp. 939-946.

Ben Upcroft et al., "Rich Probabilistic Representations for Bearing Only Decentralised Data Fusion", Proceedings of the Eighth International Conference on Information Fusion, 2005, vol. 2, pp. 1054-1061.

United Kingdom Search Report dated Aug. 26, 2006.

PCT/ISA/210.

PCT/ISA/237.

Predrag Pucar et al., "Decentralized sensor fusion and support using multiple models", The International Society for Optical Engineering SPIE-INT. Soc. Opt. Eng. USA, vol. 3068, 1997, pp. 20-31.

A. Sinha et al., "Autonomous Surveillance by Multiple Cooperative UAVs", The International Society For Optical Engineering, Proc. of SPIE, vol. 5913, 2005, pp. 1-12.

Matthew Ridley et al., "Decentralised Ground Target Tracking with Heterogeneous Sensing Nodes on Multiple UAVs", IPSN, vol. 2634, 2003, pp. 545-565.

\* cited by examiner

RELATING TARGET TRACKING

FIELD OF THE INVENTION

The present invention relates to a method for tracking a target. More particularly, the present invention relates to such a method applied to a decentralised network comprising a plurality of nodes. Each node in the network is operable to communicate with selected other nodes, and to make observations of the target. The invention also relates to means for carrying out such a method.

BACKGROUND TO THE INVENTION

A number of known target tracking methods are described in the book "Design and Analysis of Modern Tracking Systems" by Samuel Blackman and Robert Popoli, published by Artech House (1999). One particular class of tracking methods use multiple model algorithms. These advanced tracking algorithms are appropriate where the target dynamics may vary between a number of dynamic regimes. For example, the target may be an aircraft that can fly in a straight line or perform high-G manoeuvres. Multiple model techniques allow the aircraft to be accurately tracked when it transitions between these two dynamic regimes, and can be extended to allow for any number of dynamic regimes. Essentially, a number of tracking algorithms, each applying a different dynamics model to track the target, are run in parallel, and the output of the multiple model algorithms is a combination of the predictions of each tracking algorithm. One known example of a multiple model tracking algorithm is the interacting multiple models (IMM) algorithm, described by Blackman and Popoli. The IMM algorithm is a particularly efficient multiple model tracking algorithm.

Often, it is desirable to track a target using a number of sensors, so that the target can be tracked over a wider area, or so that a number of sensors of different type can be used. In order for optimal tracking to be achieved in such situations, it is necessary for data from all the sensors to be fused. A number of network architectures suitable for such fusion are known. These architectures can be classified as centralised, distributed, or decentralised.

Most tracking methods are implemented using a centralised or distributed architecture. Centralised architectures are those in which the data that is being fused is sent to a central processing facility for fusion. The central facility processes all the data in order to output a target track. Distributed architectures differ in that the central fusion process may place some computational load on remote units. However, a central processing facility must still exist in the system in order for the results of the distributed processing to be combined. Both centralised and distributed architectures are therefore vulnerable to the loss of the central processing facility, since such a loss leads inevitably to a catastrophic failure of the entire system. Furthermore, neither centralised nor distributed architectures are scaleable, firstly because, as the size of the network grows, the computational load placed on the central processing facility increases rapidly, and secondly because the quantity of data that must be communicated to and from the central processing facility increases rapidly with the size of the network. The size of the network is thus limited by available bandwidth for communication, and the computational power of the central processing facility.

Decentralised architectures are known, for example from the paper "Data Fusion in Decentralised Sensing Networks" by Hugh Durrant-Whyte and Mike Sterns, published in the Proceedings of the 4$^{th}$ International Conference on Information Fusion, Canada 2001. There is no central processing facility in a decentralised network. Each node is able to form a global estimate based on local sensor observations and information communicated to it by selected other nodes in the network. Normally, these other nodes will be adjacent or nearest neighbour nodes. In contrast to centralised and distributed architectures, no sensing, processing or communication component is critical to the operation of a network having a decentralised architecture. Thus failure of any single element results in only an incremental decrease in performance, rather than a catastrophic system failure as would happen in a network having a distributed or centralised architecture. Furthermore, no node requires knowledge of the global network topology, and the system can therefore be scaled simply by connecting new sensing nodes to the system. In contrast to distributed and centralised systems, the computational and bandwidth requirements do not increase with increasing network size. Communication is managed on a node-to-node basis, rather than requiring one or more nodes to broadcast across the network.

A decentralised network is characterised by there being no central processing facility, there being no requirement for any one node in the network to have knowledge of the entire network topology (nodes need only know about selected other nodes), and there being no requirement for a common communication facility. These features ensure that decentralised architectures are more robust, more scalable and more modular than centralised or distributed systems.

Unfortunately, decentralised tracking systems have, to date, only been able to implement simple tracking algorithms. Such systems are therefore unable to efficiently track targets executing complex manoeuvres. Distributed network architectures implementing IMM algorithms are known, for example from the paper "Centralised and Decentralised IMM Algorithms for Multisensor Track Fusion" by T. Ito and M. Faroq, published in the Proceedings of the Workshop on Estimation, Tracking and Fusion: A Tribute to Yaakob Bar-Shalom, Monterey Calif., 2001, which, in fact, does not disclose an IMM algorithm that is decentralised in the sense of the present application, but a distributed IMM algorithm which retains a centralised process to fuse estimates from remote sensing nodes. Each node performs an IMM procedure on locally generated data only, and a central fusion unit combines these resulting estimates. Such a process is not decentralised in the sense of the present invention, and therefore still exhibits the problems and disadvantages described above.

OBJECTS AND SUMMARY OF THE INVENTION

Against the above-described background, the present invention aims to overcome, or at least partially mitigate, some of the above-identified problems. It is a further aim of the present invention to provide a decentralised tracking system that can more effectively track a manoeuvring target, and that is more scalable, more robust, and more modular than currently-known tracking systems.

In broad terms, the present invention resides in providing a decentralised network of sensors operable to track a target using multiple model tracking techniques, and in overcoming the problems associated with implementing a multiple model tracking algorithm in a decentralised network.

In accordance with a first aspect of the present invention, there is provided a method of tracking a target, the method being applied to a decentralised network comprising a plurality of nodes, each node comprising a sensor operable to make target observations, communication means operable to transmit and receive track information, and storage means operable to store track information; the method comprising performing, at a local node, the steps of:

(i) providing a set of target dynamics models;
(ii) providing a set of initial model probabilities, each initial model probability being associated with one of the set of target dynamics models, and each initial model probability being related to the probability that the target dynamics are in accordance with its associated target dynamics model;
(iii) providing a set of initial model target state estimates, each initial model target state estimate being associated with one of the set of target dynamics models;
(iv) calculating a set of predicted model target state estimates by applying each target dynamics model to its associated initial model target state estimate;
(v) in response to a target observation being made at the local node, performing a first tracking procedure, thereby updating track information stored at the local node;
(vi) in response to track information being received at the local node from a remote node, performing a second target tracking procedure, thereby updating track information stored at the local node; and
(vii) communicating updated track information to selected other nodes in the network;

wherein the first tracking procedure comprises the steps of:

(a) calculating updated model probabilities in dependence on a difference between the target observation and the predicted model target state estimate;
(b) calculating updated model target state estimates in dependence on the predicted model target state estimate and the target observation; and
(c) calculating a composite predicted target state estimate by combining the predicted model target state estimates using a weighting related to the updated model probabilities;

and the second tracking procedure comprises the step of:

(a) conservatively fusing the received track information with track information stored at the local node to produce fused track information;

and wherein the track information comprises one or more of: the updated composite target state estimate, the updated model target state estimates, and the updated model probabilities. The method may further comprise the steps of repeating steps (i) to (vii) above at each node in the network, and then iterating steps (iv) to (vii) at each node in the network by using, in place of the initial model probabilities and the initial model target state estimates, the updated model probabilities and the updated model target state estimates from the immediately preceding iteration.

Methods according to the present invention can be implemented in decentralised networks because the algorithmic structure of the tracking method is the same at each node in the network. Accordingly, the advantages associated with decentralised networks are also inherent in the present invention: that is, methods according to the present invention are scaleable, robust, and modular. The bandwidth required for communication within networks embodying methods in accordance with the present invention does not increase with increasing network size, and thus any number of nodes can be incorporated into such networks. The loss of any one node in such a network will result only in an incremental loss of performance of the whole network, regardless of which node is lost. However, by implementing a multiple models tracking algorithm, methods according to the present invention exhibit much better tracking performance than previously known decentralised tracking methods. One particular embodiment of the invention, described in detail hereinbelow, exhibits an improvement in track position error of between 130 m and 360 m for bandwidths in the range 10 to 1000 tracks per second (as is shown in FIG. 3 of the attached drawings). It will be seen, therefore, that the invention is particularly suited to use at low communication bandwidths.

The invention advantageously allows a network of nodes to operate using a decentralised network architecture, whilst only communicating a small amount of data (for example, only their composite target state estimates). The algorithm places no restrictions on the topology of the network, and is completely self-consistent in any arbitrary network. Moreover, the fusion of track information from remote nodes with that stored at the local node improves the quality of the local estimates. This improved estimate quality is achieved despite the communication of only a small amount of data through the network. It will therefore be readily apparent that the invention improves the quality of target state estimates, whilst maintaining the benefits of using only a very low network bandwidth.

The method may further comprise step of mixing the initial model target state estimate by combining, with a first initial model target state estimate, a proportion of each of the other initial model target state estimates, the proportion being related to the probability that, during the immediately preceding iteration, the target dynamics transitioned from being in accordance with the target dynamics model associated with said other initial model target state estimate, to being in accordance with the target dynamics model associated with the first initial model target state estimate; and repeating the combination procedure for each initial model target state estimate.

The first tracking procedure may further comprise the step of associating the target observation with track information stored at the local node. The second tracking procedure may further comprise the step of associating the received track information with track information stored at the local node. The step of associating the target observation, or, as the case may be, the received track information, with track information stored at the local node, enables the tracking procedures to function robustly in the presence of noise and clutter signals. Moreover, this data association step allows multiple targets to be tracked by the network simultaneously.

The step of conservatively fusing the received track information with track information stored at the local node may comprise applying a covariance intersection algorithm. The covariance intersection algorithm is one convenient example of a conservative algorithm for fusing data.

The second tracking procedure may comprise the step of updating the initial model probabilities through application of a Bayesian network. A Bayseian network is able to take into account a wide variety of contextual data when updating the model probabilities, such as, for example, whether or not jamming signals have been detected.

According to one exemplary embodiment of the invention, the tracking information may comprise the updated composite target state estimate. Thus, each node transmits and receives only the composite target state estimates, and the required bandwidth is low. The plurality of nodes may then comprise at least a first node and a second node, and the set of target dynamics models provided at the first node may be different to the set of target dynamics models provided at the second node. Advantageously, the network is then more adaptable to the addition of further nodes, since there is no requirement for each node to operate the same target dynamics models.

Alternatively, according to another exemplary embodiment of the invention, the track information may comprise the updated model target state estimates and the updated model probabilities. The same set of target dynamics models may then be provided to each node in the network. The communication of more track information allows each node to achieve a better target state estimate, at the expense of requiring greater bandwidth than is required when only the composite target state estimate is communicated between the network nodes. The second tracking procedure may then comprise conservatively fusing each received updated model target state estimate with its corresponding local model target state estimate, and conservatively fusing each received updated model probability with its corresponding local probability.

According to a second aspect of the present invention, there is provided a method of tracking a target, the method being applied to a decentralised network comprising a plurality of nodes, the method comprising the steps of:
  (i) a first node performing a multiple models tracking algorithm, thereby updating track information stored at the first node.
  (ii) the first node communicating updated track information to selected other nodes in the network;
  (iii) the first node, in response to receiving track information from another node, conservatively fusing the receiving track information with local track information; and
  (iv) repeating steps (i) to (iii) at each node in the network.

Preferably, the multiple models algorithm is an interacting multiple models algorithm. The interacting multiple models algorithm is a particularly efficient multiple models algorithm.

The invention extends to a decentralised network of nodes adapted to perform a method as described above. The invention further extends to a computer program which, when executed, is operable to carry out a method as described above.

The above and further features of the invention are set forth with particularity in the appended claims, and will be described in detail hereinafter with reference to the accompanying drawings.

DETAILED DESCRIPTION

Figure 1:
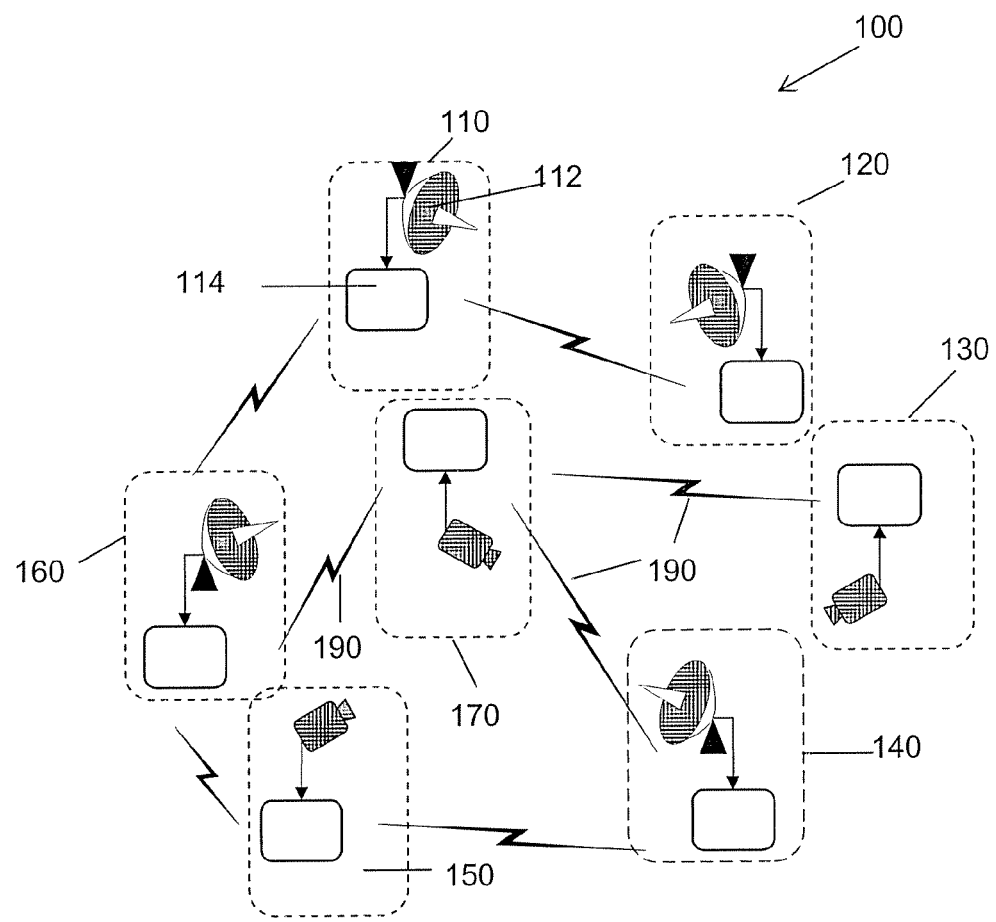
FIG. 1 is a schematic illustration of a decentralised network of nodes.

A decentralised network, common to all the embodiments described hereinbelow, is illustrated in FIG. 1. Network 100 comprises nodes 110, 120, 130, 140, 150, 160 and 170. Each of the nodes comprises processing and communication means, and a sensor. For example, node 110 comprises sensor 112, and processing and communication means 114. Sensor 112 may, for example, be a radar sensor. The components of the remaining nodes have not been labelled for the sake of clarity, but it will be understood that nodes, 120, 130, 140, 150, 160 and 170 may comprise sensors of the same type as node 110, or of a different type. When the network is in use to track a target, each node outputs track information comprising details of the target's state. This information may include details of target position, velocity, other attributes—such as target type—or a mixture of such details. Individual nodes, that comprise means to perform these functions, are enclosed in FIG. 1 by broken lines.

The network is a decentralised network. Each node is in communication only with selected other nodes. For example, node 170 is in communication with nodes 130, 140, and 160, as is indicated schematically by arrows 190. In practice, each node is in communication with its nearest neighbour nodes, although this is not immediately apparent from the schematic illustration in FIG. 1. Moreover, each node is operable to process both locally generated track information, and track information communicated to it from other nodes, in order to produce a target state estimate. It will therefore be understood that the target state estimate produced at, for example, node 140, will be based on track information generated throughout the network 100—including, for example, track information generated at node 160. This is because, although node 140 is not in direct communication with node 160, it is in direct communication with node 150, which is, in turn, in direct communication with node 160. Track information generated at node 160 will therefore influence the target state estimate at node 140 through its effect on the target state estimate at node 150. Thus each node in network 100 produces a target state estimate based on global track information.

Figure 2:
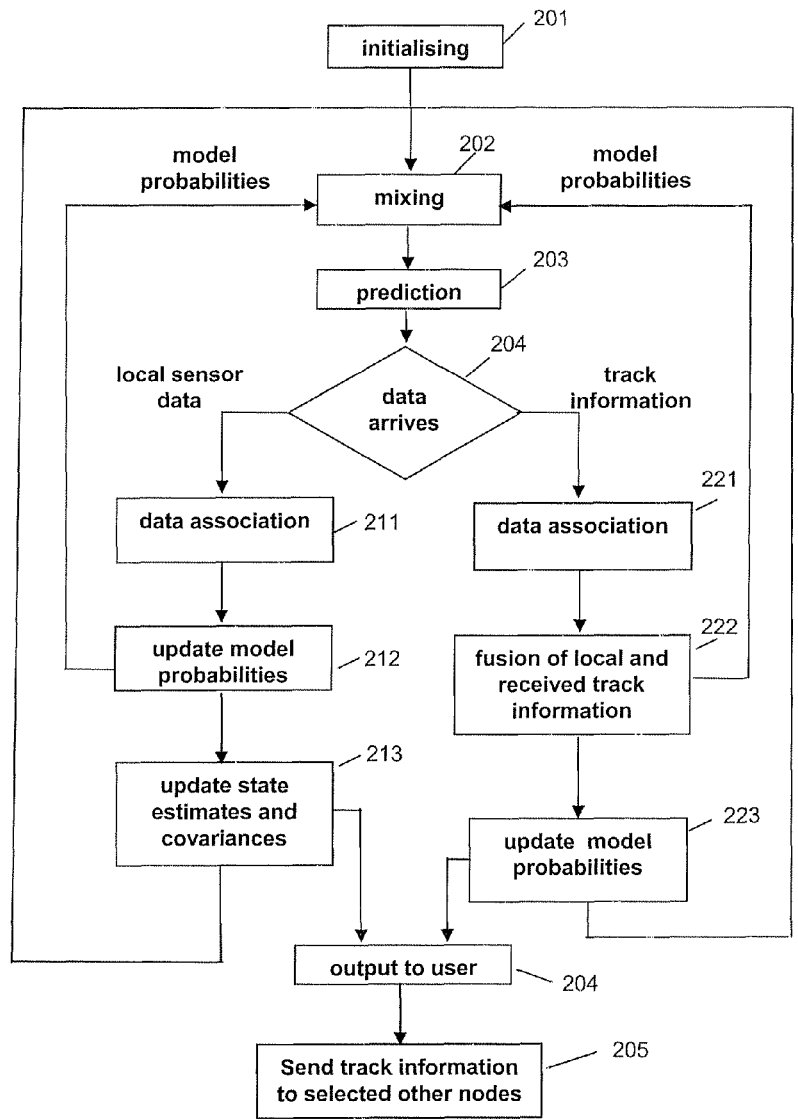
FIG. 2 is a flow-chart illustrating a tracking method in accordance with embodiments of the invention.

FIG. 2 is a flow chart illustrating the steps performed by each node in producing a target state estimate using a method in accordance with a first embodiment of the invention. Essentially, each node implements an interacting multiple models (IMM) algorithm based on track information available to it, with locally generated sensor data being treated in substantially the same way as occurs in known IMM implementations, and data received from other nodes in the network being incorporated into the locally stored track information through use of conservative fusion techniques. The IMM algorithm is an example of a multiple models algorithm. It uses a Markov model to combine the estimates and covariances from the multiple models so as to account for the target transitioning between the various dynamics regimes.

In accordance with the first embodiment of the invention, the nodes 110, 120, 130, 140, 150, 160, and 170 may implement IMM algorithms using the same or different target dynamics models. At first, each node is initialised such that each target dynamics model used in its local IMM implementation is provided with an initial model target state estimate, and an initial model probability. Each initial model target state estimate is associated with an initial covariance, which quantifies the uncertainty in its associated initial model target state estimate. Once thus initialised, the node is operable to run the illustrated steps iteratively, with the model probabilities and model target state estimates from the immediately previous iteration being used as the initial model target state estimates and the initial model probabilities for the each iteration. For the sake of clarity, therefore, the label "initial" is dropped in the description below. It is to be noted that the initial model target state estimates may be chosen relatively freely, since the algorithm is insensitive to errors The structure illustrated in the flow chart shown in FIG. 2 can be described, in general terms, as follows. Steps 201 and 202 are mixing and prediction steps. These steps mix the various model estimates, and then use the mixed model estimates to predict the current target state. The mixing step ensures that the individual model target state estimates do not diverge from each other. In response to data arriving at step 203, the node either, in the event that the data is locally generated, runs a standard interacting multiple models algorithm (steps 211 to 213), or, in the event that the data is received from another node, fuses it with local data through steps 211 to 223. This process results in a set of updated model target state estimates with associated updated covariances, and a set of updated model probabilities. These updated quantities, whether produced through either the channel comprising steps 211 to 213 or that comprising 211 to 223, are used in the next iteration of the IMM algorithm. The output, that comprises either a combination of the various model target state estimates, or simply the model target state estimate having the highest associated model probability, is communicated to a user at step 204, and then updated track information is sent to selected other nodes in the network at step 205.

An iteration of the algorithm illustrated schematically by the flow chart shown in FIG. 2, at a time-step k, will now be described in detail. The node at which the algorithm is being performed is referred to, in the description below, as the local node, whilst the other nodes in the network are referred to as remote nodes. It will be appreciated by those skilled in the art that, due to the decentralised architecture of network 100, the local node could be any of nodes 110, 120, 130, 140, 150, 160, or 170, comprised in the network 100, and that the same steps described below will be performed at each node.

Step 201 begins immediately after the model target state estimates and their associated covariances and model probabilities have been calculated for time-step (k−1). Step 201 is the mixing step, in which the model target state estimates from each target dynamics model at time (k−1) are mixed together, thus accounting for the possibility that the target dynamics transition between target dynamics models in the time interval between time step (k−1) and time step k, and ensuring that the various model target state estimates do not diverge to too great an extent. In the present embodiment, the interacting multiple models algorithm implemented at the local node comprises target dynamics models 1 ... i, j ... r, and the following quantities are defined:

$x_i(k-1|k-1)$ is the model target state estimate of target dynamics model at time k−1 based on all measurements up to time k−1;

$P_i(k-1|k-1)$ is the covariance associated with $x_i(k-1|k-1)$;

$u_i(k-1)$ is the probability that the target dynamics are in accordance with target dynamics model i at time k−1;

$u_{ij}(k-1)$ is the conditional probability, given that the target is in a state in which its dynamics are in accordance with model j, that the target transitioned to that state from one in which its dynamics were in accordance with target dynamics model i at time step k−1; and $P_{ij}$ is the conditional probability, given that the target is initially in a state in which its dynamics are in accordance with target dynamics model i, that the target transitions to a state in which its dynamics are in accordance with target dynamics model j.

Given the above definitions, it can also be seen that:

$$u_{ij}(k-1)=P_{ij}u_i(k-1)/C_j(k-1),$$

where $C_j(k-1)$ is the probability that, after mixing step 201 has been completed, the target dynamics are in accordance with target dynamics model j, and is calculated by:

$$C_j(k-1) = \sum_{i=1}^{r} P_{ij}u_i(k-1).$$

The mixed model target state estimates and their associated covariances are therefore calculated for each model j using:

$$x_j^0(k-1 \mid k-1) = \sum_{i=1}^{r} u_{ij}(k-1)x_i(k-1 \mid k-1)$$

$$P_j^0(k-1 \mid k-1) = \sum_{i=1}^{r} u_{ij}(k-1)[P_i(k-1 \mid k-1) + DP_{ij}(k-1)],$$

in which the term $DP_{ij}(k-1)$ is used to account for the differences between the state estimates of the target dynamic models i and j. It is an increment applied to the covariance $P_j^0(k-1|k-1)$ that ensures consistency in the propagation of uncertainties through the tracking procedure in the event that the covariances associated with the target state estimates of modes i and j do not overlap (i.e. when the model target state estimates for models i and j would, in the first instance, appear to be inconsistent). The term is defined by:

$$DP_{ij}(k-1|k-1)=Dx_{ij}(k-1)Dx_{ij}^T(k-1),$$

where $$Dx_{ij}(k-1)=x_i(k-1|k-1)-x_j^0(k-1|k-1).$$

It can therefore be seen that the mixed estimates, at time k−1, for each model j are a linear combination of $x_i(k-1|k-1)$ for all target dynamic models i=1 ... r using, as a weighting, the conditional probability $u_{ij}$ defined above.

Once mixed estimates and covariances are calculated for each model j, step 202 is performed. Step 202 is a standard Kalman prediction step to the next time step, performed for each model i, and resulting in the quantities $x_i(k|k-1)$ and $P_i(k|k-1)$ which are, respectively, the model target state estimate for model i at time k, based on measurements up to time (k−1), and the covariance associated therewith at time k, based on measurements up to time (k−1). This prediction step comprises applying each target dynamics model to its associated model target state estimate—for example, in the case of a target dynamics model specifying that the target moved in a straight line at a constant velocity, the prediction step would simply move the position of the target forward, in the direction of travel, by a distance equal to the velocity multiplied by the time interval. The covariance associated with the model target state estimate is similarly propagated forwards by one time step through application of the appropriate target dynamics model.

A composite state estimate and composite covariance can then be calculated using:

$$x(k \mid k-1) = \sum_{j=1}^{r} C_j(k-1)x_j(k \mid k-1)$$

$$P(k \mid k-1) = \sum_{j=1}^{r} C_j(k-1)P_j(k \mid k-1).$$

These composite quantities are linear combinations of the quantities $x_i(k|k-1)$ defined above, that use, as a weighting, the probabilities $C_i(k-1)$. The probabilities $C_i(k-1)$, as described above, are the probabilities that the target dynamics are in accordance with target dynamics model i, as calculated immediately after the mixing step 201. The composite quantities $x(k|k-1)$ can be used for association steps 211, 221, once new data arrives at 203. New data can arrive either as new sensor data, generated by the local sensor, or as track information communicated from another node. These different data types are treated differently in the node architecture, as indicated schematically by the split, at step 203, in the flow diagram illustrated in FIG. 2, and their treatments are described separately below.

In the event that the new data is sensor data generated at the local node, an IMM update procedure is followed. At step 211, data association is performed using the composite quantities $x_i(k|k-1)$ and $P_i(k|k-1)$. Any known data association technique may be used; a number of such techniques are described by Blackman and Popoli. At step 212, the model probabilities are updated using the Kalman filter innovation $v_i(k)$ and innovation covariance $S_i(k)$ for each target dynamics model i. The innovation is related to the discrepancy between the predicted model target state estimate $x_i(k|k-1)$, and the observation made by the local sensor. For each model i, a normalised scalar error $d_i^2(k)$ is then calculated using:

$$d_i^2(k) = v_i^T(k) S_i^{-1}(k) v_i(k)$$

Using Gaussian assumptions and an observation of dimension m, the likelihood for the observation using model i is calculated using:

$$\Lambda_i(k) = \frac{\exp\left(-\frac{1}{2}d_i^2(k)\right)}{\sqrt{(2\pi)^m |S_i(k)|}}$$

The model probabilities are updated using Bayes' rule, giving:

$$u_i(k) = \Lambda_i(k) C_i(k-1)/C$$

where C is a normalising constant, calculated using:

$$C = \sum_{j=1}^{r} \Lambda_j(k) C_j(k-1)$$

These updated model probabilities are then stored and used in the next iteration of the tracking procedure, in the mixing step 201. The sensor data is then used to update the target state estimates for each model i at step 213. This step is a standard Kalman update step, resulting in the quantities $x_i(k|k)$ and $P_i(k|k)$, which represent, respectively, the model target state estimate for model i at time k based on measurements up to time k, and its associated covariance. This model target state estimate is obtained using a weighted sum of the predicted model target state estimate and the innovation for the relevant target dynamics model, the weighting being calculated to minimise the covariance $P_i(k|k)$.

Output is generated for the user at step 204. The user output is in the form of quantities $x(k|k)$ and $P(k|k)$ which represent a composite target state estimate and its associated covariance respectively, and which are calculated using a linear combination of the individual model target state estimates and weighted using the updated model probabilities, and a linear combination of the individual model covariances, weighted using the updated model probabilities:

$$x(k|k) = \sum_{j=1}^{r} C_j x_j(k|k-1)$$

$$P(k|k) = \sum_{j=1}^{r} C_j P_j(k|k-1)$$

At step 205, updated track information is communicated to selected other nodes in the network. In accordance with the first embodiment of the invention, the updated track information comprises the above composite quantities $x(k|k)$ and $P(k|k)$ only.

Returning to step 203, in the event that data arriving is not locally generated, but received from a remote node, steps 221, 222 and 223 are performed. Data arriving from the remote node comprises track information, which, in the present embodiment, comprises composite quantities $x(k|k)$ and $P(k|k)$ as calculated by the remote node, based on track information stored at the remote node. Step 221 is a data association step analogous to step 211 described above, and can be performed using any known data association technique, such as those described by Blackman and Popoli.

The received composite estimate cannot be treated in the same way as locally generated sensor data. Since the network is a decentralised network of which no one node has global knowledge, there may be correlations between the received track information and the information already stored at the node. In contrast, data generated locally through observations made by the sensor at the local node is known not to be correlated with already-stored data. The received track information is therefore fused with local track information at step 222 using a conservative fusion algorithm that preserves consistency when fusing correlated data, rather than the Kalman update used for locally generated data. In the event that the track information received from the remote node were correlated with track information already stored at the local node, the Kalman update would result in too optimistic an estimate of the uncertainty in the target state estimate. Instead, conservative fusion techniques allow for the existence of correlations and avoid making too-optimistic estimates.

An exemplary such algorithm is the covariance intersection (CI) algorithm, described by the authors S. Julier and J. Uhlmann in "General Decentralised Data Fusion with Covariance Intersection", published in "Handbook of Data Fusion", edited by D. Hall and J Llinas, and published by CRC Press (2001). The covariance intersect algorithm is used, in the present embodiment, to fuse a composite estimate A received from a remote node at time k with the current model target state estimates of each model i used in the interacting multiple models algorithm implemented at the local node. Thus, for estimates having means and covariances $$x_A(k|k), P_A(k|k),$$

$$x_i(k|k), P_i(k|k),$$

in which those quantities having the subscript A relate to the composite estimate received from the remote node, and those quantities having the subscript i relate to the model target state estimate for model i at the local node, the covariance intersect update is written:

$$P_C(k|k) = [\omega P_A^{-1}(k|k) + (1-\omega) P_i^{-1}(k|k)]^{-1}$$

$$x_C(k|k) = P_C(k|k)[\omega P_A^{-1}(k|k) x_A(k|k) + (1-\omega) P_i^{-1}(k|k) x_i(k|k)],$$

where $\omega$ is selected to minimise the determinant of the resulting covariance matrix $P_C(k|k)$. As will be appreciated by those skilled in the art, $\omega$ could also be chosen to minimise some other heuristic, such as the trace of the resulting covariance matrix $P_C(k|k)$. When the same problem is formulated in information space, the estimates can be rewritten as:

$$Y_A(k|k) = P_A^{-1}(k|k) x_A(k|k), \; Y_A(k|k) = P_A^{-1}(k|k),$$

$$Y_i(k|k) = P_i^{-1}(k|k) x_i(k|k), \; Y_i(k|k) = P_i^{-1}(k|k),$$

and the CI update takes on a more simple form:

$$Y_C(k|k) = \omega Y_A(k|k) + (1-\omega) Y_i(k|k)$$

$$y_C(k|k) = \omega y_A(k|k) + (1-\omega) y_i(k|k).$$

This process is repeated for every target dynamics model i at the local node, thus updating each model with the track information from the remote node.

The model probability update step 223 is then performed. When processing locally-generated sensor data, this is done through a Bayesian update using the innovation information. However, this is not generally possible when fusing received track information, because of the possibility of there being common information. In the present embodiment, therefore, a more general Bayesian network formulation is implemented. This formulation can use a wide variety of data to infer track intent, and can therefore directly update the model probabilities. The contextual data can include data from electronic surveillance measures, detection of jamming signals, information from IFF (identification friend or foe) systems, or data relating to the type of platform that is being tracked. For example, large transport planes may be considered less likely to undertake high-G manoeuvres than smaller aircraft. As a further example, in the event that jamming signals were detected, an increased likelihood of the occurrence of manoeuvres might be inferred. Thus the model probability for a target dynamics model describing constant velocity motion would be reduced, whilst that for a target dynamics model describing high-G manoeuvres might be increased. The Bayesian network formulation allows all such information to be combined in an efficient manner so as to directly update the model probabilities. This Bayesian network formulation replaces the update based on the observation innovation in the data fusion channel (comprising steps 221, 222, and 223 in the flow chart shown in FIG. 2), whilst the traditional update is retained for the local data channel (that comprises steps 211, 212, and 213 as illustrated in the flow chart shown in FIG. 2).

It is noted that implementation of a method in accordance with the first embodiment of the invention places no restrictions on network topology, and is completely consistent in arbitrary networks. The tracking method of the first embodiment is thus adaptable to be implemented in any network.

A second embodiment of the invention will now be described. The second embodiment is very similar to the first embodiment described above, except in that the track information, rather than comprising only the composite target state estimate and its associated covariance, comprises each of the model target state estimates and their associated covariances. Thus, in accordance with the second embodiment, all of the nodes must implement IMM algorithms using the same target dynamics models. Locally generated data is treated in the same way as described above with reference to the first embodiment.

The communication of the complete set of individual model target state estimates, rather than only the composite target state estimate, from the remote nodes to the local node, allows the local node to achieve a better result, at the cost of the extra bandwidth required to send the greater amount of data. Referring back to FIG. 2, on receiving the track information from the remote node at step 204, the local node performs data association step 221, as described above with reference to the first embodiment, and then uses the covariance intersection algorithm to fuse each of the received model target state estimates with its corresponding local model target state estimate at step 222. The covariance intersection algorithm implementation for the second embodiment is similar to that for the first embodiment, and is thus only described in summary. The update equations for each target dynamics model i are written as $$Y_i = \omega Y_i + (1-\omega) Y_{Ai}$$

$$y_i = \omega y_i + (1-\omega) y_{Ai}$$

where $Y_i$ and $y_i$ are the local information states for model i, and $Y_{Ai}$ and $y_{Ai}$ are the information states for model i as communicated from a remote node. As is the case in the first embodiment, $\omega$ is selected to minimise the determinant of the resulting covariance matrix, or some other convenient heuristic. The process is repeated for every model i.

The model probability update step 223 can also be performed using a conservative fusion process, with each local model probability being fused with its corresponding model probability as communicated from the remote node. For example, a covariance intersection algorithm, analogous to that described above for the target state estimates, can be used. The value of $\omega$ can be any heuristic derived from the model probability distribution. Alternatively, the value of $\omega$ used for the state update at step 222 can be used, and the model probabilities appropriately renormalized after the update step. It is also possible to use a Bayesian network formulation to update the model probabilities directly, as is described above with reference to the first embodiment.

The second embodiment of the invention requires more bandwidth intensive than the first embodiment, as it requires the communication of i different state estimates and their associated model probabilities, rather than the communication of only one composite estimate, as is the case for the first embodiment. It is noted that, as is the case with the first embodiment of the invention, implementation of a method in accordance with the second embodiment of the invention places no restrictions on network topology, and is completely consistent in arbitrary networks.

A series of tests were performed in order to evaluate the performance of the embodiments of the invention against relevant benchmarks. The test scenario involved 100 target aircraft flying in a region of 8 sensing nodes. The nodes were spatially separated such that multiple sensors were able to see each target. However, no sensor was able to detect all 100 targets at any one time. The target aircraft flew trajectories that included manoeuvres of up to 7G.

Figure 3:
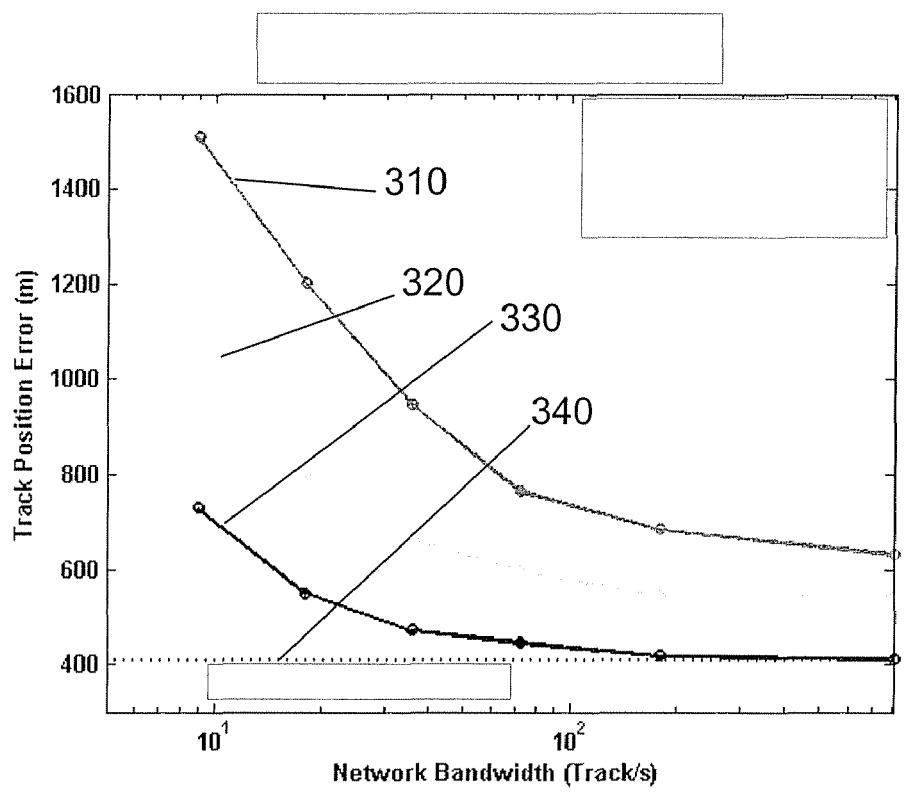
FIG. 3 is a graph illustrating the variation of track position error with network bandwidth for a number of tracking methods.

An exemplary selection of the results of these tests is illustrated in FIG. 3. FIG. 3 is a graph illustrating the variation of track position error (measured in meters) with network bandwidth (measured in number of tracks communicated per second). Line 310 illustrates the results achieved using a track selection system. In this system, a centralised processor receives track information from all sensing nodes and simply selects the best track, which is chosen to be that having the covariance matrix with the lowest determinate. This benchmark was chosen because it is similar to many multi-sensor tracking systems currently being used. Line 320 illustrates the results achieved using a standard implementation of a decentralised network of sensing nodes that uses the covariance intersection algorithm to fuse data from remote nodes, and a simple Kalman filter to track the target at each node. Line 330 illustrates the results achieved using a network of sensing nodes that implement a decentralised IMM process in accordance with an embodiment of the invention. The IMM uses three target dynamics models. The models used were essentially the same, but with appropriate parameters modified so that different levels of target acceleration could be accommodated by the different models. The dashed line labelled with reference numeral 340 represents the lower bound on performance when using the IMM algorithm, and is the result achieved using a centralised IMM algorithm, that receives raw sensor data from all sensors present in the network. However, whilst this represents the best achievable result for the IMM algorithm, it is, in practice, unfeasible because of the very large amounts of data that must be communicated throughout the network, and the corresponding high bandwidth requirement.

The number of tracks which each sensing node can transmit each second—i.e. the bandwidth available to the network—was used as one of the test parameters because one of the key advantages of the present invention is its ability to operate efficiently whilst being constrained to use low bandwidth communications. The results illustrated in FIG. 3 demonstrate that the performance of the network is best, at all bandwidths, when it implements the tracking method according to an embodiment of the invention. The performance of the tracking method according to an embodiment of the invention in fact approaches the lower bound (indicated by dashed line 340) once the network bandwidth increases above 100 tracks per second. The track selection algorithm is the worst at all bandwidths, whilst the performance of the standard DDF algorithm is intermediate between that of the track selection algorithm, and that of the tracking method according to an embodiment of the invention. It is to be noted that the performance of the tracking method according to an embodiment of the invention is the best, by a significant margin, over the entire range of bandwidths tested.

Having described the invention with reference to various specific embodiments, it is noted that these embodiments are in all resects exemplary. Variations and modifications are possible without departing from the scope of the invention, which is defined in the accompanying claims. Such variations and modifications will be immediately obvious to those skilled in the art. For example, whilst, in the above, various possible methods are described through which track information received from remote nodes, or contextual data, can be used to update the individual model probabilities at step 223 (shown in FIG. 2), it will understood by those skilled in the art that it is also possible to update the model probabilities only at step 212 (shown in FIG. 2), such that the model probabilities at a local node are updated only with locally generated sensor data, and not with track information received from remote nodes. Furthermore, whilst, in the above, a network comprising only sensing nodes has been described, it will be understood that the network may additionally comprise non-sensing nodes. Such non-sensing nodes may be used for the purpose of relaying track information between sensing nodes. Alternatively, such a non-sensing node may be provided at a command location, where it may be advantageous to retain track-processing facilities, but where there may not be a need for a sensor. The network may also comprise nodes having more than one sensor.

Finally, it is noted that it is to be clearly understood that any feature described above in relation to any one embodiment may be used alone, or in combination with other features described, and may also be used in combination with one or more features of any other of the embodiments, or any combination of any other of the embodiments.

The invention claimed is:

1. A method of tracking a target at a local node in a decentralised network having a plurality of nodes, each node comprising a processor, a sensor operable to make target observations, communication means operable to transmit and receive track information, and storage means operable to store track information at the local node, the method comprising:

in the processor of each node:
(i) associating each initial model probability of a set of initial model probabilities with a target dynamics model of a set of target dynamics models, wherein each initial model probability is related to a probability that target dynamics are in accordance with an associated target dynamics model;
(ii) associating each initial model target state estimate of a set of initial model target state estimates with the target dynamic model of the set of target dynamics models;
(iii) calculating a set of predicted model target state estimates by applying each target dynamics model to an associated initial model target state estimate;
(iv) in response to a target observation being made at the local node, performing a first tracking procedure, thereby updating track information stored at the local node;
(v) in response to track information being received at the local node from a remote node, performing a second target tracking procedure, thereby updating track information stored at the local node; and
(vi) communicating updated track information to selected other nodes in the network;

and wherein the first tracking procedure comprises the steps of:
(a) calculating updated model probabilities in dependence on a difference between the target observation and the predicted model target state estimate;
(b) calculating updated model target state estimates in dependence on the predicted model target state estimate and the target observation; and
(c) calculating a composite predicted target state estimate by combining the predicted model target state estimates using a weighting related to the updated model probabilities;

and the second tracking procedure comprises the step of conservatively fusing the received track information with track information stored at the local node to produce fused track information; and wherein the track information comprises one or more of: the updated composite target state estimate, the updated model target state estimates, and the updated model probabilities.

2. The method as claimed in claim 1, further comprising the steps of repeating steps (i) to (vii), at each node in the network, and then iterating steps (iv) to (vii), at each node in the network by using, in place of the initial model probabilities and the initial model target state estimates, the updated model probabilities and the updated model target state estimates from the immediately preceding iteration.

3. The method as claimed in claim 2, further comprising the step of mixing the initial model target state estimate by combining, with a first initial model target state estimate, a proportion of each of the other initial model target state estimates, the proportion being related to the probability that, during the immediately preceding iteration, the target dynamics transitioned from being in accordance with the target dynamics model associated with said other initial model target state estimate, to being in accordance with the target dynamics model associated with the first initial model target state estimate; and repeating the combination procedure for each initial model target state estimate.

4. The method as claimed in claim 3, wherein the first tracking procedure further comprises the step of associating the target observation with track information stored at the local node.

5. The method as claimed in claim 4, wherein the second tracking procedure further comprises the step of associating the received track information with track information stored at the local node.

6. The method as claimed in claim 5, wherein the step of conservatively fusing the received track information with track information stored at the local node comprises applying a covariance intersection algorithm.

7. The method as claimed in claim 5, wherein the tracking information comprises the updated composite target state estimate.

8. The method as claimed in claim 7, wherein the plurality of nodes comprises at least a first node and a second node, and wherein the set of target dynamics models provided at the first node is different to the set of target dynamics models provided at the second node.

9. The method as claimed in claim 5, wherein the track information comprises the updated model target state estimates and the updated model probabilities.

10. The method as claimed in claim 9, wherein the same set of target dynamics models is provided to each node in the network.

11. The method as claimed in claim 10, wherein the second tracking procedure comprises conservatively fusing each received updated model target state estimate with its corresponding local model target state estimate, and conservatively fusing each received updated model probability with its corresponding local probability.

12. The method as claimed in claim 5, wherein the second tracking procedure comprises the step of updating the initial model probabilities through application of a Bayesian network.

13. A method of tracking a target, the method being applied to a decentralised network comprising a plurality of nodes, the method comprising the steps of:
  in a processor of a first node:
    (i) performing a multiple models tracking algorithm, thereby updating track information stored at the first node;
    (ii) communicating updated track information to selected other nodes in the network; and
    (iii) in response to receiving track information from another node, conservatively fusing the receiving track information with local track information; and
  in a processor of each other node in the network:
    (iv) performing a multiple models tracking algorithm to update track information stored at each respective other node; and
    (v) performing steps (ii) and (iii) above at each respective other node in the network.

14. The method as claimed in claim 13, wherein the multiple models tracking algorithm is an interacting multiple models tracking algorithm.

15. A decentralised network of nodes, wherein each node comprises:
  sensing means for detecting tracking information of a target;
  means for providing each target dynamics model with a model target state estimate and a model probability;
  means for applying each target dynamics model to an associated initial model target state estimate;
  means for calculating updated model probabilities based on a difference between tracking information of a target and a predicted model target state estimate;
  means for calculating updated model target state estimates based on the predicted model target state estimate and the tracking information of the target;
  means for calculating a composite predicted target state estimate by combining the predicted model target state estimates using a weighting related to the updated model probabilities to generate updated tracking information; and
  communication means for communicating the updated tracking information to selected other nodes in the network.

16. A decentralized network of nodes, wherein each node comprises:
  sensing means for detecting tracking information of a target;
  storage means for storing tracking information,
  means for providing each target dynamics model with a model target state estimate and a model probability;
  means for applying each target dynamics model to an associated initial model target state estimate;
  means for associating tracking information received from another node with tracking information stored in said storage means;
  means for fusing the associated tracking information received from another node and the tracking information stored in said storage means,
  means for updating the tracking information stored in said storage means with the fused tracking information; and
  communication means for communicating the updated tracking information to selected other nodes in the network.

* * * * *